US012452605B2

(12) United States Patent
Toita et al.

(10) Patent No.: US 12,452,605 B2
(45) Date of Patent: Oct. 21, 2025

(54) SPEAKER

(71) Applicant: ALPS ALPINE CO., LTD., Tokyo (JP)

(72) Inventors: Hiroki Toita, Fukushima (JP); Yusuke Yoshida, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 274 days.

(21) Appl. No.: 18/107,756

(22) Filed: Feb. 9, 2023

(65) Prior Publication Data

US 2023/0269540 A1 Aug. 24, 2023

(30) Foreign Application Priority Data

Feb. 21, 2022 (JP) ................................ 2022-024790

(51) Int. Cl.
*H04R 9/06* (2006.01)
*H04R 7/12* (2006.01)
*H04R 9/02* (2006.01)
*H04R 9/04* (2006.01)

(52) U.S. Cl.
CPC ............... *H04R 9/046* (2013.01); *H04R 7/12* (2013.01); *H04R 9/025* (2013.01); *H04R 9/06* (2013.01)

(58) Field of Classification Search
CPC .......... H04R 9/046; H04R 9/025; H04R 9/06; H04R 7/12
See application file for complete search history.

(56) References Cited

U.S. PATENT DOCUMENTS

| | | | | |
|---|---|---|---|---|
| 6,724,910 B1 | 4/2004 | Heed | | |
| 2001/0043713 A1* | 11/2001 | Tokusho | H04R 9/06 | 381/407 |
| 2006/0269094 A1* | 11/2006 | Kato | H04R 1/06 | 381/410 |
| 2007/0025586 A1* | 2/2007 | Young | H04R 9/022 | 381/410 |

FOREIGN PATENT DOCUMENTS

| | | |
|---|---|---|
| EP | 0 610 769 B1 | 5/2001 |
| JP | S 59-22120 | 2/1984 |
| JP | 59-221200 | 12/1984 |
| JP | 63-121151 | 5/1988 |
| JP | 63-278492 | 11/1988 |

(Continued)

OTHER PUBLICATIONS

Extended European Search Report for corresponding European Application No. 23154411.5-1207, Jul. 7, 2023, 9pp.

(Continued)

*Primary Examiner* — Suhan Ni
(74) *Attorney, Agent, or Firm* — Crowell & Moring LLP

(57) ABSTRACT

A speaker includes a diaphragm having a perfectly circular hole in which a bobbin is attached and an oval or elliptical outer peripheral end. The diaphragm includes a perfectly circular cross-sectional area in the range of a predetermined height above a base having the perfectly circular hole. The diaphragm further includes an intermediate area whose outer surface has a small curvature radius above the perfectly circular cross-sectional area and an expanded area that is oval in cross section above the intermediate area.

16 Claims, 7 Drawing Sheets

(56) References Cited

FOREIGN PATENT DOCUMENTS

| | | | |
|---|---|---|---|
| JP | H 024309 | | 1/1990 |
| JP | H 0243092 | | 3/1990 |
| JP | H03 213098 | A | 9/1991 |
| JP | H04-299699 | A | 10/1992 |
| JP | H07-222279 | A | 8/1995 |
| JP | 2000 102092 | A | 4/2000 |
| WO | WO 90/04317 | A1 | 4/1990 |

OTHER PUBLICATIONS

Japanese Notification of Reasons for Refusal for JP 2022-024790, Jun. 23, 2025, 11 pgs.
European Office Action from EP 23 154411.5-1207, Jul. 22, 2025, 17 pgs.

* cited by examiner

SPEAKER

RELATED APPLICATION

The present application claims priority to Japanese Patent Application Number 2022-024790, filed Feb. 21, 2022, the entirety of which is hereby incorporated by reference.

BACKGROUND

1. Field of the Invention

The present disclosure relates to speakers including a bobbin around which a voice coil is wound and a diaphragm having a perfectly circular hole in which the bobbin is fixed and that is longer in a major axis than in a minor axis at an outer peripheral end.

2. Description of the Related Art

Some speakers for use in vehicles and at home have a diaphragm that is longer in a major axis than in a minor axis perpendicular to the major axis at the outer peripheral end. For example, speakers disclosed in JP 4-299699 A and JP 7-222279 A include a diaphragm having an oval or elliptical outer peripheral end. This allows a diaphragm with a large area to be disposed even in a space with a limited shape, improving the reproduction characteristics in a low-frequency range.

The speaker disclosed in JP 4-299699 A includes an oval or elliptical diaphragm whose cross section connecting a voice-coil joint portion and an outer edge line is a curve having no straight lines or inflection points at any position. The speaker has no folded portion at the ridge of the diaphragm. This eliminates reflection of vibration at inflection points and improves the rigidity of the diaphragm, thereby decreasing attenuation of sound pressure in a high-frequency band.

The speaker disclosed in JP 7-222279 A includes an elliptical diaphragm configured to have a fixed curvature obtained by an equation at any position. This configuration allows the voice coil to be always driven stably, which prevents rolling and stabilizes the characteristics, providing a compact high-performance speaker.

The diaphragms of the speakers disclosed in JP 4-299699 A and JP 7-222279 A have a perfectly circular hole at the center to join with a bobbin including a voice coil. In the process of manufacturing the diaphragm, the diaphragm is generally formed by pressing paper or another material into a three-dimensional shape and then punching the hole.

However, the diaphragm is oval or elliptical in cross section taken along a plane perpendicular to the center line at a portion other than the hole. This causes the stress to be unbalanced between in the major axis direction and in the minor axis direction, and when the hole is punched, to deform the vicinity of the hole and make the outer peripheral end liable to be warped. The deformation in the vicinity of the hole makes it difficult to reliably join the diaphragm and the bobbin together, and the warping at the outer peripheral end makes it impossible to join the outer peripheral end of the diaphragm and the edge member together. These problems cannot be solved merely by selecting a material for the diaphragm.

SUMMARY

The present disclosure solves the above problems. It is an object of the present disclosure to provide a speaker including a diaphragm that is longer in a major axis than in a minor axis and that has a structure in which the hole to which a bobbin is joined and the outer peripheral end are barely deformed.

A speaker according to an aspect of the present disclosure includes a diaphragm, a bobbin fixed to the diaphragm, a voice coil wound around the bobbin, and a magnetic circuit configured to provide magnetic flux to the voice coil, wherein the diaphragm includes a base on one side along a reference line extending in a sounding direction and an end on another side, the base including a hole, the end including an outer peripheral end, wherein the bobbin is fixed in the hole, wherein, when projected to a plane perpendicular to the reference line, the hole has a perfectly circular shape centered on the reference line, and the outer peripheral end is larger in dimension along a major axis than along a minor axis perpendicular to the major axis, and wherein the diaphragm includes a perfectly circular cross-sectional area in a predetermined height range from an intermediate portion between the base and the end to the base, wherein, in the predetermined height range, the perfectly circular cross-sectional area is perfectly circular in cross section taken along a plane perpendicular to the reference line.

Preferably, the speaker according an aspect of the present disclosure is configured such that, in a cross section containing the reference line, an outer surface of the perfectly circular cross-sectional area has an arc shape having a center of curvature outside the diaphragm, wherein the arc shape has a constant radius around a whole circumference in a direction of rotation about the reference line.

Preferably, the speaker according an aspect of the present disclosure is configured such that the diaphragm includes an expanded area nearer to the end than the perfectly circular cross-sectional area, wherein, in a cross section containing the reference line, an outer surface of the expanded area has an arc shape having a center of curvature outside the diaphragm, wherein a radius of the arc shape in the major axis is larger than the radius in the minor axis, wherein the radius in the major axis and the radius in the minor axis are larger than the radius of the perfectly circular cross-sectional area.

More preferably, the speaker according an aspect of the present disclosure is configured such that the diaphragm includes an intermediate area between the perfectly circular cross-sectional area and the expanded area, wherein, in a cross section containing the reference line, an outer surface of the intermediate area has an arc shape having a center of curvature outside the diaphragm, wherein, in the intermediate area, a radius of the arc shape is constant around a whole circumference in a direction of rotation about the reference line, and the radius of the intermediate area is smaller than the radius of the perfectly circular cross-sectional area.

Preferably, the speaker according an aspect of the present disclosure is configured such that, when projected to a plane perpendicular to the reference line, the intermediate area is larger in width along the major axis than along the minor axis.

Preferably, the speaker according an aspect of the present disclosure further includes a reinforcing sheet fixed to an outer surface or an inner surface of the perfectly circular cross-sectional area.

For example, the speaker according an aspect of the present disclosure may further include a wiring material conducting to the voice coil, wherein the wiring material may fasten the diaphragm and the reinforcing sheet together in the perfectly circular cross-sectional area.

The speaker according to an aspect of the present disclosure is configured such that the diaphragm is larger in dimension in the major axis than in the minor axis. This allows the diaphragm to be disposed in a long and narrow space and to be increased in area, thereby making the diaphragm suitable for low-frequency reproduction. The diaphragm is perfectly circular in cross section at a position close to the hole in the base. In the perfectly circular cross-sectional area, the diaphragm is perfectly circular in cross section in a predetermined height range. This allows for correcting unbalanced stress applied to the hole between in the major axis direction and in the minor axis direction in forming the diaphragm into a three-dimensional shape, easily preventing deformation of the vicinity of the hole and warping of the outer peripheral end.

DETAILED DESCRIPTION OF THE PREFERRED EMBODIMENTS

Figure 1:
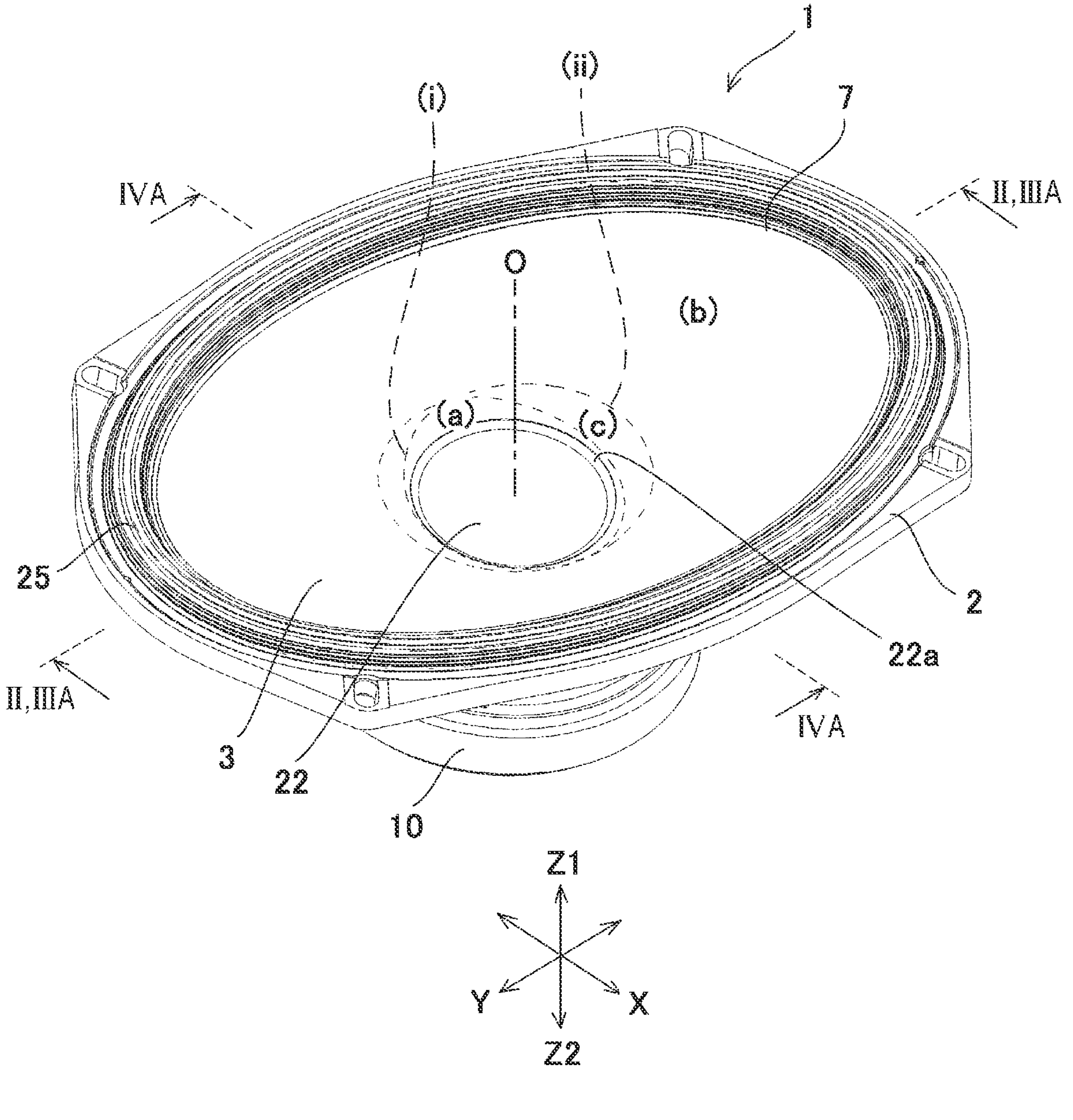
FIG. 1 is a perspective view of a speaker according to an embodiment of the present invention illustrating the overall structure.
Figure 2:
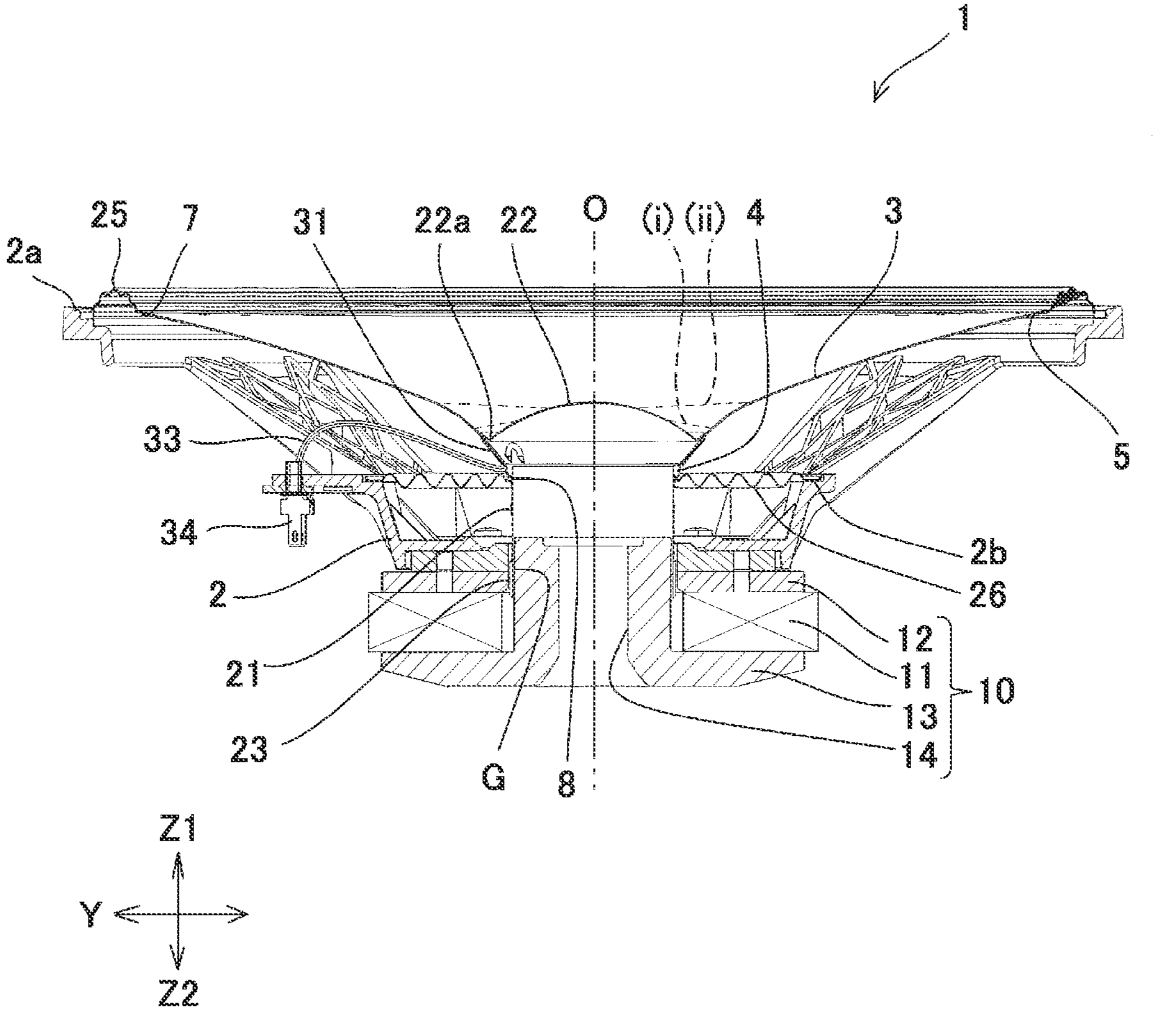
FIG. 2 is a longitudinal cross-sectional view of the speaker shown in FIG. 1 taken along line II-II.

FIGS. 1 and 2 illustrate the overall structure of a speaker 1 according to a first embodiment of the present invention. The height direction of the speaker 1 is the Z1-Z2 direction. Either the Z1-direction or the Z2-direction is a main sounding direction. The Z1-Z2 direction is a front-back direction with respect to the sounding direction. FIG. 1 illustrates a reference line O extending in the height direction (the Z1-Z2 direction). The principal part of the speaker 1 has an approximately rotationally symmetrical structure centered on the reference line O. The reference line O is also the center line. FIG. 1 illustrates an X-axis and a Y-axis perpendicular to each other in a plane perpendicular to the reference line O. The speaker 1 is oval or elliptical in plan view projected to a plane perpendicular to the reference line O, in which the minor axis is in the X-direction and the major axis is in the Y-direction.

The speaker 1 illustrated in FIGS. 1 and 2 includes a frame 2. The frame 2 is made of a nonmagnetic or magnetic material and has a tapered shape whose diameter gradually increases upward (in the Z1-direction). A magnetic circuit 10 is fixed to the bottom (in the Z2-direction) of the frame 2 by screwing or another means.

As shown in FIG. 2, the magnetic circuit 10 includes a ring-shaped magnet 11 centered on the reference line O, a ring-shaped opposing yoke 12 joined to the top of the magnet 11, and a lower yoke 13 joined to the bottom of the magnet 11. The lower yoke 13 is integral to a center yoke 14. The center yoke 14 is located inside the magnet 11 and the opposing yoke 12 and protrudes upward (Z1-direction) from the lower yoke 13. The center yoke 14 may be separate from the lower yoke 13 and may be joined to the lower yoke 13. The opposing yoke 12, the lower yoke 13, and the center yoke 14 are made of a magnetic material, that is, a magnetic metal material.

The center yoke 14 is columnar and has a magnetic gap G between the outer peripheral surface and the inner peripheral surface of the opposing yoke 12 along the circumference centered on the reference line O. In the magnetic circuit 10, a driving magnetic flux generated from the magnet 11 circles around the magnetic path crossing the magnetic gap G from the opposing yoke 12 to the center yoke 14 and the lower yoke 13.

Figure 3A:
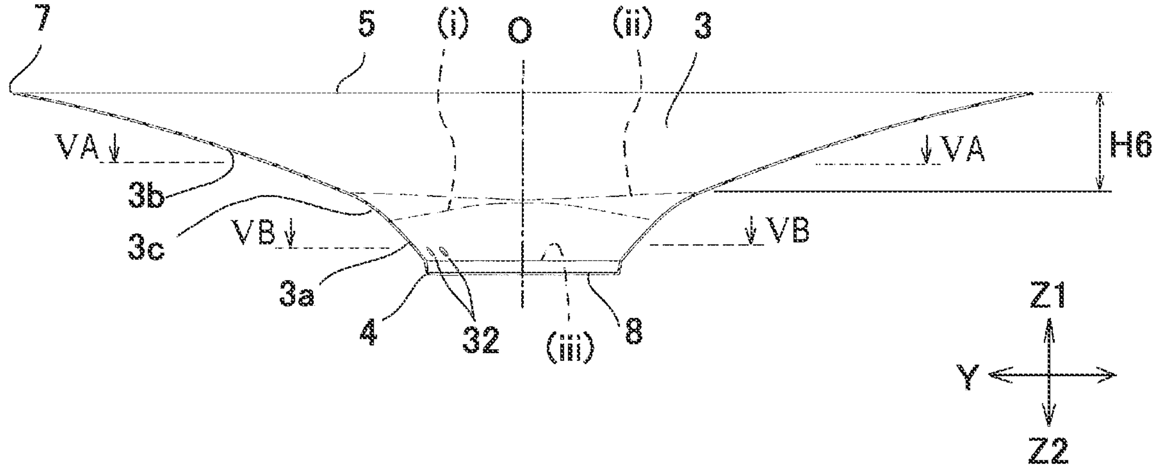
FIG. 3A is a longitudinal cross-sectional view of the diaphragm alone taken along line IIIA-IIIA shown in FIG. 1.
Figure 3B:
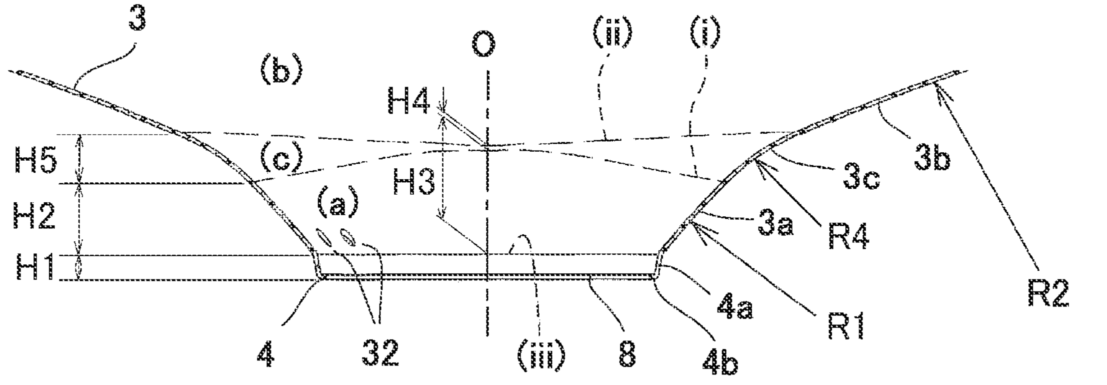
FIG. 3B is an enlarged cross-sectional view of the vicinity of a base in the cross-sectional view taken along line IIIA-IIIA.
Figure 4A:
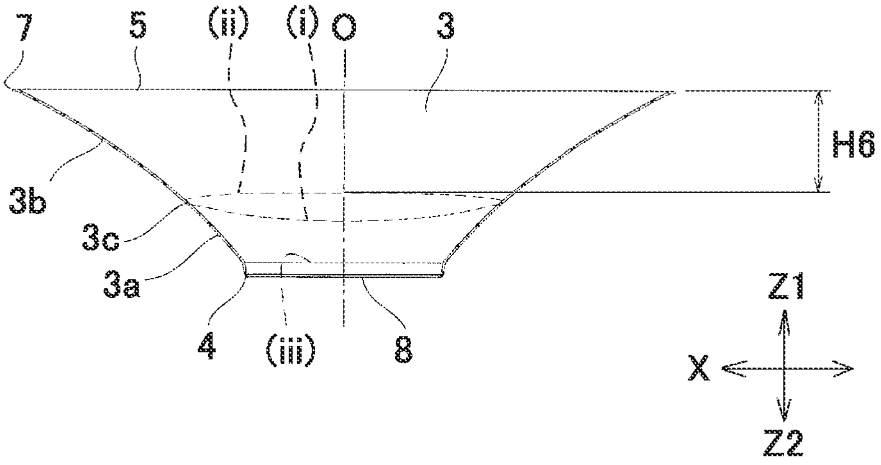
FIG. 4A is a longitudinal cross-sectional view of the diaphragm alone taken along line IVA-IVA in FIG. 1.
Figure 4B:
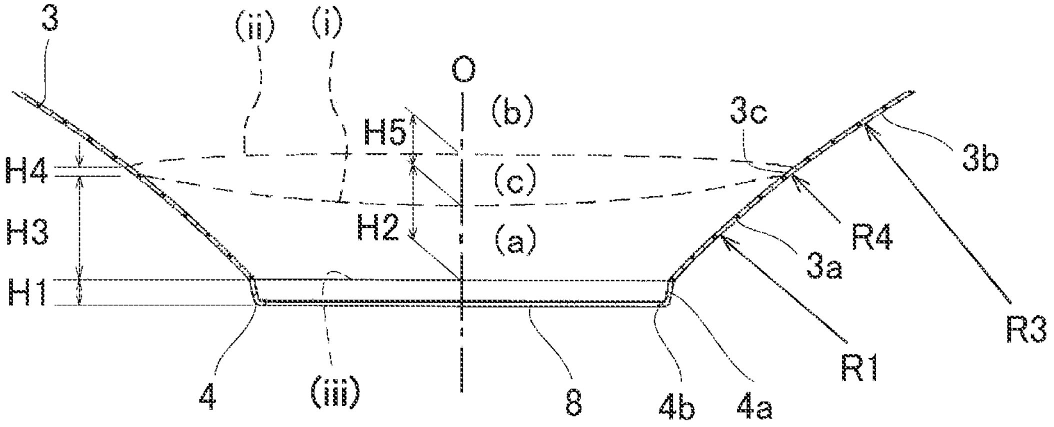
FIG. 4B is an enlarged cross-sectional view of the vicinity of the base in the cross-sectional view taken along line IVA-IVA.
Figure 6:
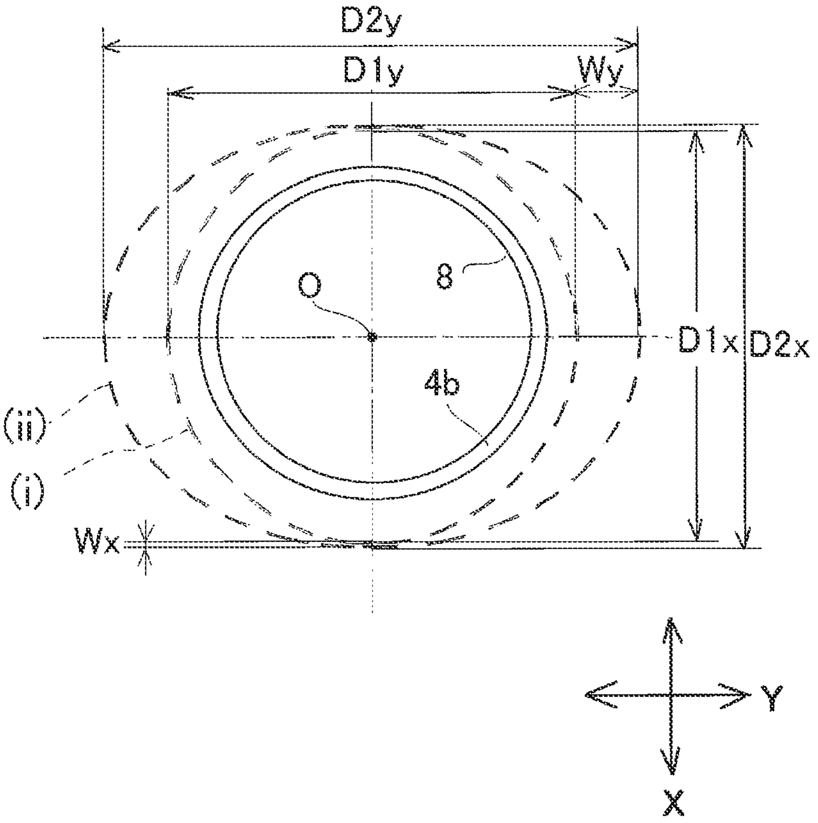
FIG. 6 is a partial plan view of a hole in the base, a perfectly circular cross-sectional area, and an intermediate area of the diaphragm.

A diaphragm 3 is disposed inside the upper part of the frame 2. The diaphragm 3 has a so-called cone shape that is stereoscopic in the height direction (in the Z1-Z2 direction). As shown in FIGS. 3A and 4A, the diaphragm 3 has a base 4 on one side along the reference line O, or the lower side (Z2 side), and an end 5 on the other side, or the upper side (Z1 side). The base 4 is a lower end (orientated to the Z2-direction) of the diaphragm 3, and the end 5 is an upper end (orientated to the Z1-direction) of the diaphragm 3. FIGS. 3B and 4B illustrate the cross-sectional shape of the vicinity of the base 4 of the diaphragm 3 in enlarged view. FIG. 6 illustrates the planar shape of the base 4 in enlarged view. As shown in FIGS. 3B and 4B, the diaphragm 3 has an approximately cylindrical base circumferential surface 4*a* centered on the reference line O in the area of height H1 extending upward from the base 4. The base 4 of the diaphragm 3 further has a base bottom surface 4*b* adjoining to the lower end of the base circumferential surface 4*a* and perpendicular to the reference line O. The base bottom surface 4*b* has a hole 8. As shown in FIG. 6, the planar shape of the hole 8 projected to a plane perpendicular to the reference line O is perfectly circular centered on the reference line O. The diaphragm 3 has an outer peripheral end 7 along the end 5. The planar shape of the outer peripheral end 7 projected to a plane perpendicular to the reference line O is an oval or elliptical shape that is larger in the major axis (the Y-axis) direction than in the minor axis (the X-axis) direction.

As shown in FIG. 2, a bobbin 21 is disposed inside the frame 2. The bobbin 21 has a perfectly circular cylindrical shape in cross section centered on the reference line O. The bobbin 21 is placed in the hole 8 of the base 4 of the diaphragm 3. The inner edge of the hole 8 is fixed to the outer peripheral surface of the bobbin 21 with an adhesive. A dome-shaped cap 22 protruding upward is provided at the center of the diaphragm 3. The cap 22 covers the upper opening of the bobbin 21. The periphery 22*a* of the cap 22 is fixed to the upper surface of the diaphragm 3 with an adhesive.

As shown in FIG. 2, a voice coil 23 is disposed around the lower outer peripheral surface (the Z2-direction) of the bobbin 21. A coated conducting wire constituting the voice coil 23 is wound a predetermined number of turns around the outer peripheral surface of the bobbin 21. The voice coil 23 is located in the magnetic gap G of the magnetic circuit 10.

As shown in FIG. 2, an elastically deformable edge member 25 is disposed between a front-end periphery 2*a* of the frame 2 and an outer peripheral end 7 of the diaphragm 3. The edge member 25 and the front-end periphery 2*a*, and the edge member 25 and the outer peripheral end 7 are fixed with an adhesive. An inner-periphery fixed portion 2*b* is formed on the inner surface of an intermediate portion of the frame 2. The outer periphery of an elastically deformable damper 26 that is corrugated in cross section is fixed to the inner-periphery fixed portion 2*b* with an adhesive. The inner periphery of the damper 26 is bonded and fixed to the outer peripheral surface of the bobbin 21.

The diaphragm 3 and the bobbin 21 are supported so as to be vibrated vertically (in the Z1-Z2 direction) with respect to the frame 2 by the elastic deformation of the edge member 25 and the damper 26.

Next, the details of the structure of the diaphragm 3 will be described.

FIG. 3A is a longitudinal cross-sectional view of the diaphragm 3 in the major axis direction taken along a Y-Z plane containing the reference line O. FIG. 3B is a partial enlarged cross-sectional view of the diaphragm 3 illustrating the cross-section structure of the vicinity of the base 4 shown in FIG. 3A. FIG. 4A is a longitudinal cross-sectional view of the diaphragm 3 in the minor axis direction taken along an X-Z plane containing the reference line O. FIG. 4B is a partial enlarged cross-sectional view of the vicinity of the base 4 of the diaphragm 3 shown in FIG. 4A. FIG. 6 is a partial plan view of the vicinity of the base 4 of the diaphragm 3 seen from above. FIG. 1 is a perspective view of the diaphragm 3 seen from above.

In FIGS. 1, 2, 3A, 3B, 4A, 4B, 6, and 7, a first curvature boundary (i) and a second curvature boundary (ii) are indicated by broken lines in the diaphragm 3. The inner surface and the outer surface of the diaphragm 3 are shown as a curved profile in a longitudinal section containing the reference line O. The curvature of the curved profile changes with location. The first curvature boundary (i) and the second curvature boundary (ii) have different curvatures. The first curvature boundary (i) and the second curvature boundary (ii) are smoothly arc-shaped with different curvature radii. The inner surface and the outer surface of the diaphragm 3 are smoothly curved without folding and wrinkles at the first curvature boundary (i) and the second curvature boundary (ii). Thus, the first curvature boundary (i) and the second curvature boundary (ii) are not present in actual appearance and are indicated by the broken lines for the convenience of description.

As shown in FIGS. 3A and 3B and FIGS. 4A and 4B, the diaphragm 3 has a base curvature area (a) between an edge (iii) above the base circumferential surface 4*a* extending from the base 4 and the first curvature boundary (i) located above the edge (iii) and, above the base curvature area (a), an expanded area (b) from the second curvature boundary (ii) to the outer peripheral end 7 of the end 5. The diaphragm 3 also has an intermediate area (c) between the first curvature boundary (i) and the second curvature boundary (ii).

As shown in FIGS. 3B and 4B, the curve profile of the outer surface 3*a* of the diaphragm 3 in the base curvature area (a) in a cross section taken along a Y-Z plane containing the reference line O and in a cross section taken along an X-Z plane containing the reference line O is an arc shape (a partially arc shape) with a first radius R1 having the center of curvature outside the diaphragm 3. In the base curvature area (a), the first radius R1 is uniform around the whole circumference in the circumferential direction (rotational direction) centered on the reference line O. The base curvature area (a) increases in opening diameter upward (in the Z1-direction).

As shown in FIGS. 3A and 3B, the curve profile of the outer surface 3*b* of the diaphragm 3 in the expanded area (b) above the second curvature boundary (ii) in a cross section taken along a Y-Z plane containing the reference line O is an arc shape (a partially arc shape) with a second radius R2 having the center of curvature outside the diaphragm 3. As shown in FIGS. 4A and 4B, the curve profile of the outer surface 3*b* of the diaphragm 3 in the expanded area (b) in a cross section taken along an X-Z plane containing the reference line O is an arc shape (a partially arc shape) with a third radius R3 having the center of curvature outside the diaphragm 3. The second radius R2 in the major axis direction is larger than the third radius R3 in the minor axis direction. The second radius R2 and the third radius R3 are larger than the first radius R1 in the base curvature area (a) (R1<R3<R2). In plan view projected to a plane perpendicular to the reference axis O, the curvature radius of the outer surface 3*b* changes continuously so as to decrease gradually from the second radius R2 to the third radius R3 from the major axis direction (the Y-direction) to the minor axis direction (the X-direction) in the range between the major axis direction (the Y-direction) and the minor axis direction (the X-direction), that is, in the angular range of 90 degrees between the X-axis and the Y-axis. The expanded area (b) increases in opening diameter in the upward direction (in the Z1-direction).

As shown in FIGS. 3B and 4B, the curve profile of the outer surface 3*c* of the diaphragm 3 in the intermediate area (c) in a cross section taken along a Y-Z plane containing the reference line O and in a cross section taken along an X-Z plane containing the reference line O is an arc shape (a partially arc shape) with a fourth radius R4 having the center of curvature outside the diaphragm 3. In the intermediate area (c), the fourth radius R4 is uniform around the whole circumference in the circumferential direction (rotational direction) centered on the reference line O. The fourth radius R4 is smaller than the first radius R1 in the base curvature area (a) (R4<R1<R3<R2). The intermediate area (c) increases in opening diameter in the upward direction (in the Z1-direction).

As shown in FIGS. 1 and 6, the first curvature boundary (i) has a circular shape whose diameter D1*x* in the minor axis direction (the X-direction) is equal to the diameter D1*y* in the major axis direction (the Y-direction) in plan view projected to a plane perpendicular to the reference line O. The second curvature boundary (ii) has an oval shape whose diameter D2*y* in the major axis direction (the Y-direction) is larger than a diameter D2*x* in the minor axis direction (the X-direction). In both of FIGS. 3A and 3B and FIGS. 4A and 4B, the first curvature boundary (i) and the second curvature boundary (ii) are curved in cross section of a plane containing the reference line O, and the second curvature boundary (ii) is above the first curvature boundary (i), that is, nearer to the end 5. As a result, as shown in FIG. 6, the interval between the first curvature boundary (i) and the second curvature boundary (ii) projected to a plane perpendicular to the reference line O, that is, the width when projected to a plane in the intermediate area (c), is Wy in the major axis direction and Wx in the minor axis direction. The width Wy is larger than the width Wx (Wx<Wy).

Figure 5A:
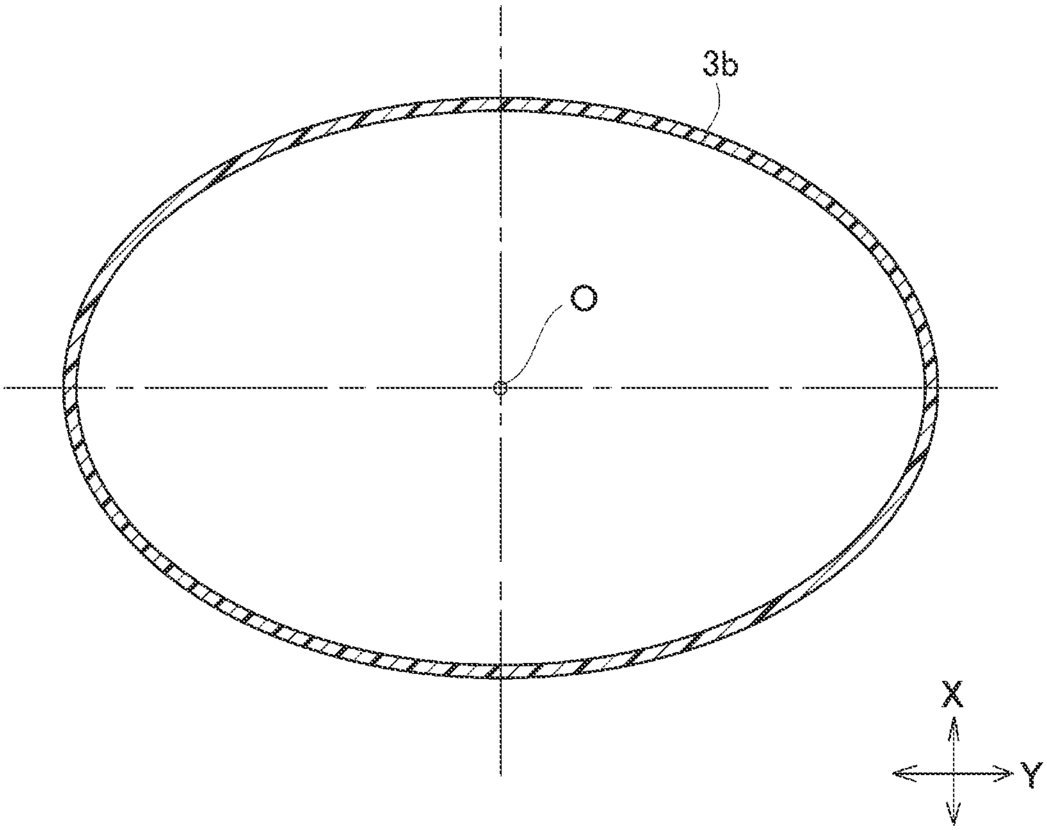
FIG. 5A is a planar cross-sectional view of the diaphragm shown in FIG. 3A taken along line VA-VA.
Figure 5B:
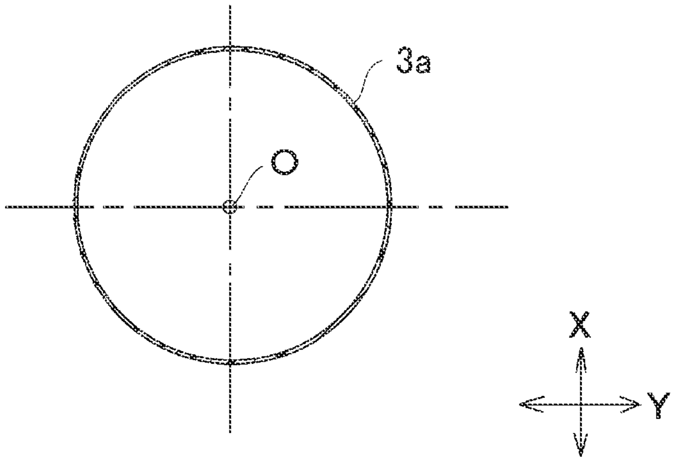
FIG. 5B is a planar cross-sectional view of the diaphragm alone taken along line VB-VB shown in FIG. 3A.

The height dimension in the direction (the Z1-Z2 direction) along the reference line O from the upper edge (iii) of the base circumferential surface 4*a* to the first curvature boundary (i) is the smallest height H2 in the cross section of the diaphragm 3 shown in FIG. 3B and the largest height H3 in the cross section of the diaphragm 3 shown in FIG. 4B. The height H2 is within the height of the base curvature area (a). For this reason, in the range of the height H2, the curvature radius of the arc shape of the outer surface 3*a* of the diaphragm 3 in the longitudinal cross-sectional view is the constant first radius R1 around the whole circumference in the rotational direction centered on the reference line O. In other words, the range of the height H2 is the "perfectly circular cross-sectional area" of the diaphragm 3, and in this "perfectly circular cross-sectional area", the cross-sectional shape taken along a plane perpendicular to the reference line O in the whole range of the height H2 is perfectly circular. FIG. 5B illustrates a perfectly circular cross section of the "perfectly circular cross-sectional area" of the diaphragm 3 taken along a plane containing line VB-VB.

The second curvature boundary (ii) is located highest (the Z1-direction) in the cross section of the diaphragm 3 shown in FIGS. 3A and 3B, that is, closer to the end 5. In FIG. 3A, the height dimension along the reference line O from the second curvature boundary (ii) to the outer peripheral end 7 in the cross section of the diaphragm 3 is H6. Since the height H6 is within the expanded area (b), the range of the height H6 is a similar oval cross-sectional area. In the similar oval cross-sectional area, the cross-sectional shape of the diaphragm 3 taken along a plane perpendicular to the reference line O is oval, and the oval shape is similar at any height.

The height dimension between the first curvature boundary (i) and the second curvature boundary (ii) in the direction along the reference line O (the Z1-Z2 direction) is the largest height H5 in the cross section of the diaphragm 3 shown in FIG. 3B and the smallest height H4 in the cross section of the diaphragm 3 shown in FIG. 4B. As shown in FIG. 6, the intermediate area (c) between the first curvature boundary (i) and the second curvature boundary (ii) is largest in width Wy in the major axis direction (the Y-direction) and smallest in width Wx in the minor axis direction (the X-direction). In the intermediate area (c), the curvature radius R4 of the arc shape of the cross section of the outer surface 3*c* of the diaphragm 3 is smaller than the curvature radii R1, R2, and R3. Since the range of the curvature radius R4 which is small in cross section in the major axis direction shown in FIG. 3B is wide along the surface of the diaphragm 3, the expansion of diaphragm 3 can be increased in the major axis direction (the Y-direction) in the expanded area (b). In contrast, in the cross section in the minor axis direction shown in FIGS. 4A and 4B, the range of the curvature radius R4 with a small diameter is narrow along the surface of the diaphragm 3. For this reason, the expansion of the diaphragm 3 in the expanded area (b) is small in the minor axis direction (the X-direction). This allows for increasing the area of the oval outer peripheral end 7 without excessively increasing the size of the diaphragm 3 in the height direction (the Z1-Z2 direction).

Preferably, the curvature radius R2 of the expanded area (b) in a major-axis cross section is 2.5 to 4.5 times the curvature radius R1 of the base curvature area (a) and the perfectly circular cross-sectional area, for example, 3.5 times. The curvature radius R3 of the expanded area (b) in a minor-axis cross section is 1.2 to 1.8 times the curvature radius R1, for example, 1.5 times. The curvature radius R4 in the intermediate area (c) is 0.15 to 0.35 times the curvature radius R1, for example, 0.25 times. The height dimensions are expressed as $H1<H5<H2<H6$.

The diaphragm 3 of this embodiment is configured such that the approximately cylindrical base circumferential surface 4*a* rises from the base 4, which is a lower end (on the Z2 side), and the range of the height H2 above the base circumferential surface 4*a* is a perfectly circular cross-sectional area. Alternatively, a perfectly circular cross-sectional area with the radius R1 may be formed from the base 4, which is the end of the diaphragm 3 on the Z2 side, to an intermediate position between the base 4 and the end 5 without the cylindrical base circumferential surface 4*a*. In other words, the perfectly circular cross-sectional area may be formed from an intermediate position between the base 4 and the end 5 of the diaphragm 3 to the base 4 or not to the base 4 but to a position halfway in the Z2-direction.

The speaker 1 of this embodiment is configured such that the diaphragm 3 shown in FIGS. 3A and 3B and FIGS. 4A and 4B has an arc shape in cross section whose outer surface 3*a* has the curvature of the first radius R1 in the perfectly circular cross-sectional area of height H2. Alternatively, the outer surface 3*a* may extend diagonally upward in a straight line in the perfectly circular cross-sectional area. In this case, the three-dimensional shape of the diaphragm 3 in the perfectly circular cross-sectional area is a truncated cone shape (a partial cone shape).

The diaphragm 3 is configured such that the range of a predetermined height from an intermediate position between the base 4 and the end 5 to the base 4 is a perfectly circular cross-sectional area. This configuration increases the strength around the hole 8 in the base 4. This makes it easy to keep the hole 8 of the base 4 perfectly circular or nearly perfectly circular even if the outer peripheral end 7 is oval or elliptical. Furthermore, the intermediate area (c) having the fourth radius R4 that is uniform in the circumferential direction is formed between the perfectly circular cross-sectional area and the expanded area (b). This allows for further reinforcement of the periphery of the portion above the perfectly circular cross-sectional area with the intermediate area (c), further facilitating keeping the perfectly circular shape of the hole 8. Furthermore, the cylindrical base circumferential surface 4*a* is formed nearer to base than the perfectly circular cross-sectional area, and the base bottom surface 4*b* bent from the base circumferential surface 4*a* is formed. This increases the rigidity of the periphery of the hole 8, further facilitating keeping the perfectly circular shape of the hole 8.

The diaphragm 3 is formed of a paper material, a paper material impregnated with resin, or a resin sheet into a three-dimensional shape, as shown in FIGS. 3A and 3B and FIGS. 4A and 4B. Thereafter, the outer peripheral end 7 is trimmed, and the hole 8 is punched off. Alternatively, the trimming of the outer peripheral end 7 and/or the punching of the hole 8 may be performed before the three-dimensional forming. Since the perfectly circular cross-sectional area, the intermediate area (c), and the base circumferential surface 4*a* reinforce the periphery of the hole 8, deformation of the hole 8 is unlikely to occur even if the outer peripheral end 7 is oval or elliptical, and unbalanced stress is applied in the major axis direction and in the minor axis direction during forming. Furthermore, distortion of the outer peripheral end 7 is unlikely to occur.

The hole 8 is kept in a perfectly circular shape or a nearly perfectly circular shape. This prevents the cylindrical bobbin 21 from being significantly deformed when the bobbin 21 is inserted into the hole 8, allowing the outer peripheral surface of the bobbin 21 and the inner periphery of the hole 8 to be reliably brought into contact with each other. This also reduces distortion of the diaphragm 3 as a whole and deformation of the outer peripheral end 7. This allows for reliably bonding the outer peripheral end 7 and the edge member 25 together.

The diaphragm 3 is circular in horizontal cross-sectional shape in the perfectly circular cross-sectional area in the range of height H2. As shown in FIGS. 1 and 2, joining the periphery 22*a* of the cap 22 to the perfectly circular cross-sectional area enables the dome-shaped cap 22 that is circular in plan view to be reliably joined to the diaphragm 3 without a gap.

Figure 7:
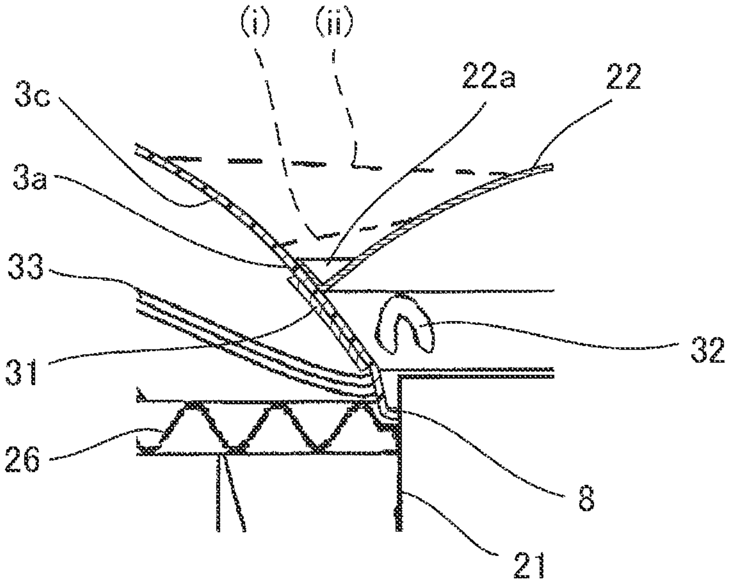
FIG. 7 is a partial enlarged cross-sectional view of the perfectly circular cross-sectional area of the diaphragm in the longitudinal cross-sectional view shown in FIG. 2.

A reinforcing sheet is attached to the outer surface or the inner surface of the perfectly circular cross-sectional area of the diaphragm 3 (the area of height H2 shown in FIGS. 3A and 3B and FIGS. 4A and 4B). As shown in FIGS. 2 and 7, the speaker 1 includes a reinforcing sheet 31 on the outer surface of the perfectly circular cross-sectional area. The reinforcing sheet 31 is made of a paper material, a paper material impregnated with resin, or a resin sheet, preferably the same material as that of the diaphragm 3, into a three-dimensional shape. The reinforcing sheet 31 is bonded and fixed to the outer surface of the diaphragm 3. The reinforcing sheet 31 is preferably shaped in advance into an approximately cone shape so as to come into close-contact with the outer surface of the perfectly circular cross-sectional area of the diaphragm 3. Alternatively, a belt-like reinforcing sheet 31 may be wound around the outer surface of the diaphragm 3 and fixed thereto.

As shown in FIG. 2, a terminal 34 is fixed to the frame 2, and a pair of wiring materials 33 conducting to the terminal 34 extends into the frame 2. Each wiring material 33 is made of a rigid wire rod which is referred to as a tinsel wire. A pair of wiring layers conducting to the opposite ends of the voice coil 23 is formed on the outer peripheral surface of the bobbin 21. The pair of wiring materials 33 and the pair of wiring layers are individually connected at the upper part of the bobbin 21 by soldering. As shown in FIGS. 3A and 3B and FIG. 7, the diaphragm 3 has small holes 32 in the perfectly circular cross-sectional area, and the reinforcing sheet 31 also has small holes at positions aligned with the small holes 32. Inserting the tinsel wiring materials 33 into the small holes and fastening the diaphragm 3 and the reinforcing sheet 31 together by sewing with the wiring materials 33 increases the fixing strength of the diaphragm 3 and the reinforcing sheet 31.

Next, the sounding operation of the speaker 1 will be described.

In the sounding operation, a driving current is input to the voice coil 23 through the terminal 34 and the wiring materials 33 on the basis of an audio signal output from an audio amplifier. A vibration unit including the bobbin 21 and the diaphragm 3 is vertically driven by an electromagnetic force excited by a driving magnetic flux crossing the voice coil 23 in the magnetic gap G of the magnetic circuit 10 and the driving current flowing through the voice coil 23 to generate a sound pressure responsive to the frequency of the driving current, thereby generating sound upward (in the Z1-direction) or downward (in the Z2-direction).

The diaphragm 3 is rigid as a whole and is barely distorted during operation because of the perfectly circular cross-sectional area. This decreases distortion of a sound frequency. The high overall rigidity increases the sound output. The diaphragm 3 includes the intermediate area (c) between the perfectly circular cross-sectional area and the expanded area (b). For this reason, even with an asymmetric structure of the expanded area (b) of the diaphragm 3 in which the expansion in the major axis direction is larger than the expansion in the minor axis direction, the surface of the diaphragm 3 can be smoothly curved at the first curvature boundary (i) and the second curvature boundary (ii). This smooths propagation of high-frequency vibration waves traveling from the inner circumference to the outer circumference of the diaphragm 3, increasing the sound quality.

Figure 8:
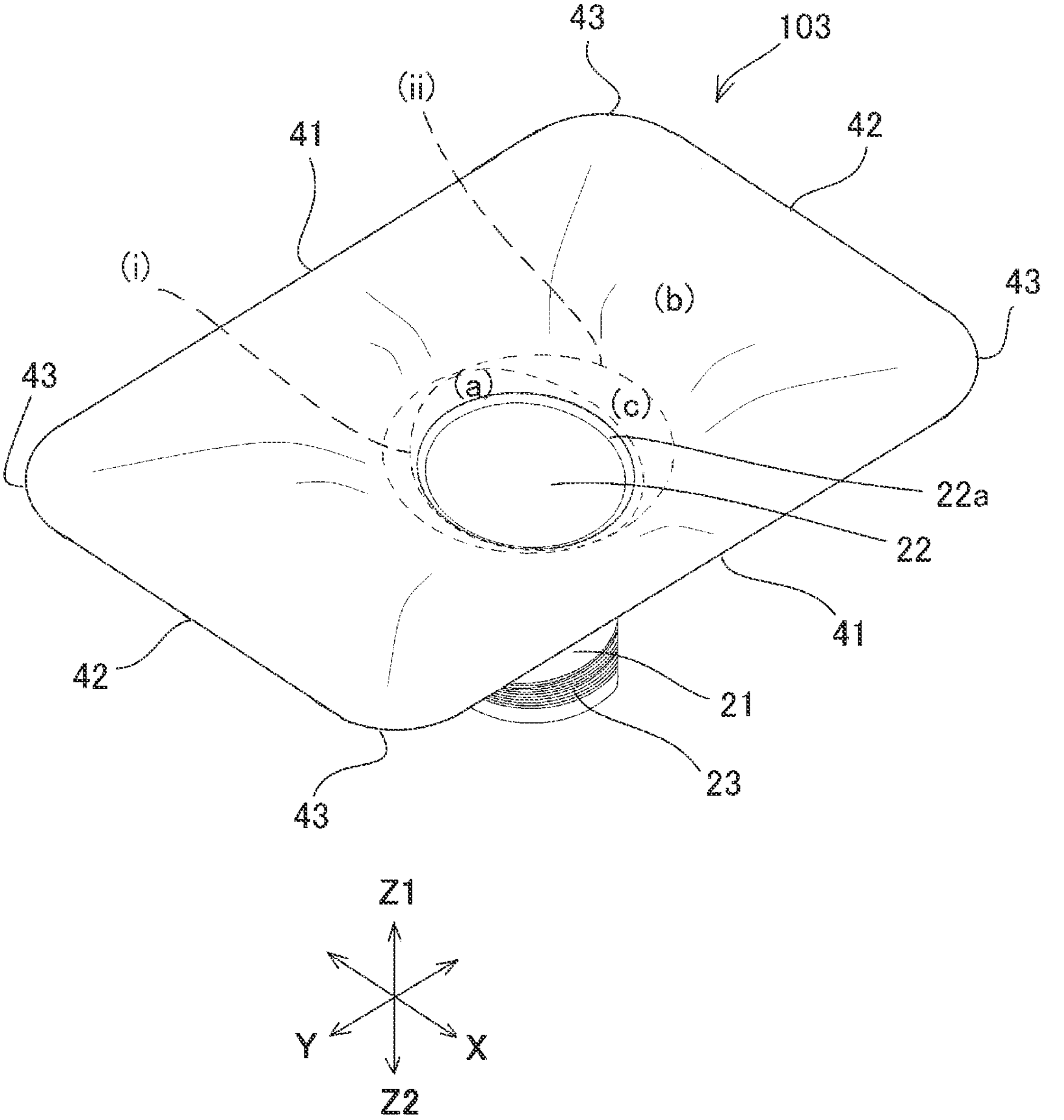
FIG. 8 is a perspective view of a diaphragm, a bobbin, and a voice coil according to a modification of the present invention.

FIG. 8 illustrates a diaphragm 103 for use in speakers according to a modification of the present invention. The diaphragm 103 is larger in the major axis direction (the Y-direction) than in the minor axis direction (the X-direction) and has a rectangular shape with straight long sides 41 and short sides 42 and curved corners 43, not an oval shape. The diaphragm 103 also provides beneficial effects similar to those of the speaker 1 including the diaphragm 3 because of the perfectly circular cross-sectional area and the intermediate area (c).

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A speaker diaphragm configured to be fixed to a bobbin around which is wound a voice coil, the speaker diaphragm comprising:

a base on one side along a reference line extending in a sounding direction and an end on another side, the base including a hole configured to receive the bobbin, wherein, when projected to a plane perpendicular to the reference line, the hole has a perfectly circular shape centered on the reference line, and the outer peripheral end is larger in dimension along a major axis than along a minor axis perpendicular to the major axis, wherein the speaker diaphragm includes a perfectly circular cross-sectional area in a predetermined height range from an intermediate portion between the base and the end to the base, wherein, in the predetermined height range, the perfectly circular cross-sectional area is perfectly circular in cross section taken along a plane perpendicular to the reference line, wherein, in a cross section containing the reference line, an outer surface of the perfectly circular cross-sectional area has an arc shape having a center of curvature outside the speaker diaphragm, wherein the arc shape has a constant radius around a whole circumference in a direction of rotation about the reference line, wherein the speaker diaphragm includes an expanded area nearer to the end than the perfectly circular cross-sectional area, wherein, in a cross section containing the reference line, an outer surface of the expanded area has an arc shape having a center of curvature outside the speaker diaphragm, wherein a radius of the arc shape in the major axis is larger than the radius in the minor axis, wherein the radius in the major axis and the radius in the minor axis are larger than the radius of the perfectly circular cross-sectional area, wherein the speaker diaphragm includes an intermediate area between the perfectly circular cross-sectional area and the expanded area, and wherein, in a cross section containing the reference line, an outer surface of the intermediate area has an arc shape having a center of curvature outside the speaker diaphragm, wherein, in the intermediate area, a radius of the arc shape is constant around a whole circumference in a direction of rotation about the reference line, and the radius of the intermediate area is smaller than the radius of the perfectly circular cross-sectional area.

2. The speaker diaphragm according to claim 1, wherein, when projected to a plane perpendicular to the reference line, the intermediate area is larger in width along the major axis than along the minor axis.

3. The speaker diaphragm according to claim 1, further comprising a reinforcing sheet fixed to an outer surface or an inner surface of the perfectly circular cross-sectional area.

4. The speaker diaphragm according to claim 3, further comprising a wiring material conducting to the voice coil, wherein the wiring material fastens the speaker diaphragm and the reinforcing sheet together in the perfectly circular cross-sectional area.

5. A speaker comprising:

a diaphragm;

a bobbin fixed to the diaphragm;

a voice coil wound around the bobbin; and a magnetic circuit configured to provide magnetic flux to the voice coil, wherein the diaphragm includes a base on one side along a reference line extending in a sounding direction and an end on another side, the base including a hole, the end including an outer peripheral end, wherein the bobbin is fixed in the hole, wherein, when projected to a plane perpendicular to the reference line, the hole has a perfectly circular shape centered on the reference line, and the outer peripheral end is larger in dimension along a major axis than along a minor axis perpendicular to the major axis, wherein the diaphragm includes a perfectly circular cross-sectional area in a predetermined height range from an intermediate portion between the base and the end to the base, wherein, in the predetermined height range, the perfectly circular cross-sectional area is perfectly circular in cross section taken along a plane perpendicular to the reference line, and wherein, in a cross section containing the reference line, an outer surface of the perfectly circular cross-sectional area has an arc shape having a center of curvature outside the diaphragm, wherein the arc shape has a constant radius around a whole circumference in a direction of rotation about the reference line.

6. The speaker according to claim 5, wherein the diaphragm includes an expanded area nearer to the end than the perfectly circular cross-sectional area, wherein, in a cross section containing the reference line, an outer surface of the expanded area has an arc shape having a center of curvature outside the diaphragm, wherein a radius of the arc shape in the major axis is larger than the radius in the minor axis, wherein the radius in the major axis and the radius in the minor axis are larger than the radius of the perfectly circular cross-sectional area.

7. The speaker according to claim 6, wherein the diaphragm includes an intermediate area between the perfectly circular cross-sectional area and the expanded area, and wherein, in a cross section containing the reference line, an outer surface of the intermediate area has an arc shape having a center of curvature outside the diaphragm, wherein, in the intermediate area, a radius of the arc shape is constant around a whole circumference in a direction of rotation about the reference line, and the radius of the intermediate area is smaller than the radius of the perfectly circular cross-sectional area.

8. The speaker according to claim 7, wherein, when projected to a plane perpendicular to the reference line, the intermediate area is larger in width along the major axis than along the minor axis.

9. The speaker according to claim 5, further comprising a reinforcing sheet fixed to an outer surface or an inner surface of the perfectly circular cross-sectional area.

10. The speaker according to claim 9, further comprising a wiring material conducting to the voice coil, wherein the wiring material fastens the diaphragm and the reinforcing sheet together in the perfectly circular cross-sectional area.

11. A speaker comprising:

a diaphragm;

a bobbin fixed to the diaphragm;

a voice coil wound around the bobbin;

a magnetic circuit configured to provide magnetic flux to the voice coil; and a reinforcing sheet, wherein the diaphragm includes a base on one side along a reference line extending in a sounding direction and an end on another side, the base including a hole, the end including an outer peripheral end, wherein the bobbin is fixed in the hole, wherein, when projected to a plane perpendicular to the reference line, the hole has a perfectly circular shape centered on the reference line, and the outer peripheral end is larger in dimension along a major axis than along a minor axis perpendicular to the major axis, wherein the diaphragm includes a perfectly circular cross-sectional area in a predetermined height range from an intermediate portion between the base and the end to the base, wherein, in the predetermined height range, the perfectly circular cross-sectional area is perfectly circular in cross section taken along a plane perpendicular to the reference line, and wherein the reinforcing sheet is fixed to an outer surface or an inner surface of the perfectly circular cross-sectional area.

12. The speaker according to claim 11, further comprising a wiring material conducting to the voice coil, wherein the wiring material fastens the diaphragm and the reinforcing sheet together in the perfectly circular cross-sectional area.

13. The speaker according to claim 11, wherein, in a cross section containing the reference line, an outer surface of the perfectly circular cross-sectional area has an arc shape having a center of curvature outside the diaphragm, wherein the arc shape has a constant radius around a whole circumference in a direction of rotation about the reference line.

14. The speaker according to claim 13, wherein the diaphragm includes an expanded area nearer to the end than the perfectly circular cross-sectional area, wherein, in a cross section containing the reference line, an outer surface of the expanded area has an arc shape having a center of curvature outside the diaphragm, wherein a radius of the arc shape in the major axis is larger than the radius in the minor axis, wherein the radius in the major axis and the radius in the minor axis are larger than the radius of the perfectly circular cross-sectional area.

15. The speaker according to claim 14, wherein the diaphragm includes an intermediate area between the perfectly circular cross-sectional area and the expanded area, and wherein, in a cross section containing the reference line, an outer surface of the intermediate area has an arc shape having a center of curvature outside the diaphragm, wherein, in the intermediate area, a radius of the arc shape is constant around a whole circumference in a direction of rotation about the reference line, and the radius of the intermediate area is smaller than the radius of the perfectly circular cross-sectional area.

16. The speaker according to claim 15, wherein, when projected to a plane perpendicular to the reference line, the intermediate area is larger in width along the major axis than along the minor axis.

* * * * *